(12) United States Patent
Lee et al.

(10) Patent No.: US 9,609,098 B2
(45) Date of Patent: Mar. 28, 2017

(54) BUTTON-TYPE CONNECTOR MODULE AND ELECTRONIC DEVICE USING THE SAME

(71) Applicant: ASUSTeK COMPUTER INC., Taipei (TW)

(72) Inventors: Yung-Sheng Lee, Taipei (TW); Cheng-Wei Chen, Taipei (TW); Chia-Hao Wu, Taipei (TW); Kang-Yu Lai, Taipei (TW); Cheng-Yao Huang, Taipei (TW); Shih-Hsuan Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/015,133

(22) Filed: Feb. 4, 2016

(65) Prior Publication Data
US 2016/0240945 A1  Aug. 18, 2016

(30) Foreign Application Priority Data
Feb. 16, 2015  (CN) .......................... 2015 1 0083355

(51) Int. Cl.
*H04M 1/02* (2006.01)
*H04M 1/23* (2006.01)

(52) U.S. Cl.
CPC .......... *H04M 1/0274* (2013.01); *H04M 1/236* (2013.01)

(58) Field of Classification Search
USPC ......... 439/327, 331, 326, 630, 159; 361/737
See application file for complete search history.

(56) References Cited

U.S. PATENT DOCUMENTS

| 5,320,552 | A | * | 6/1994 | Reichardt | H01R 12/83 439/326 |
| 5,933,328 | A | * | 8/1999 | Wallace | G06K 13/0862 257/678 |
| 5,986,891 | A | * | 11/1999 | Sugimoto | H01R 12/714 361/736 |

(Continued)

FOREIGN PATENT DOCUMENTS

| CN | 202309792 | 7/2012 |
| CN | 103885541 | 6/2014 |
| CN | 203812261 | 9/2014 |

*Primary Examiner* — Alexander Gilman
(74) *Attorney, Agent, or Firm* — Jianq Chyun IP Office

(57) ABSTRACT

A button-type connector module and an electronic device using the button-type connector module are provided. The electronic device is adapted to the pluggable hot plug component. The electronic device includes a main body and a button-type connector module. The main body includes a motherboard. The button-type connector module is disposed in the main body. The button-type connector module includes a push button unit, a connector and a circuit board. The connector includes an accommodation recess. The hot plug component is plugged into or removed from the accommodation recess, when the connector moves relative to the main body to expose the accommodation recess. The circuit board is disposed between the push button unit and the connector. The push button unit and the connector are electrically connected to the motherboard of the main body via the circuit board.

11 Claims, 4 Drawing Sheets

(56) References Cited

U.S. PATENT DOCUMENTS

| | | | | |
|---|---|---|---|---|
| 6,220,882 B1* | 4/2001 | Simmel | G06K 7/0021 |
| | | | | 439/326 |
| 6,638,087 B1* | 10/2003 | Takada | G06K 19/073 |
| | | | | 200/51.09 |
| 6,869,302 B2* | 3/2005 | Bricaud | G06K 7/0021 |
| | | | | 439/326 |
| 6,881,086 B2* | 4/2005 | Ohashi | G06K 7/0021 |
| | | | | 439/326 |
| 7,093,764 B1* | 8/2006 | Valenzuela | G06K 7/0021 |
| | | | | 235/486 |
| 7,232,326 B2* | 6/2007 | Uchida | G06K 13/0862 |
| | | | | 439/326 |
| 7,264,495 B2* | 9/2007 | Zuo | H04B 1/3816 |
| | | | | 439/326 |
| 7,311,551 B1* | 12/2007 | Krula | H04M 1/0274 |
| | | | | 439/157 |
| 7,344,401 B2* | 3/2008 | Zuo | H01R 13/2442 |
| | | | | 439/326 |
| 7,597,566 B2* | 10/2009 | Peiker | G06K 13/08 |
| | | | | 439/131 |
| 7,762,827 B2* | 7/2010 | Liu | H01R 13/639 |
| | | | | 439/331 |
| 7,762,851 B2* | 7/2010 | Li | H04B 1/3816 |
| | | | | 379/433.09 |
| 7,780,464 B2* | 8/2010 | Li | G06K 7/0021 |
| | | | | 439/327 |
| 7,794,250 B2* | 9/2010 | Imamura | G06K 7/0021 |
| | | | | 439/159 |
| 7,837,488 B2* | 11/2010 | Wu | G06K 7/0021 |
| | | | | 439/188 |
| 7,988,454 B1* | 8/2011 | Liu | G06K 13/08 |
| | | | | 439/38 |
| 8,005,509 B2* | 8/2011 | Huang | H04M 1/0202 |
| | | | | 455/550.1 |
| 8,029,300 B2* | 10/2011 | Finney | G06F 1/1632 |
| | | | | 345/558 |
| 8,116,096 B2* | 2/2012 | Tang | H04B 1/3816 |
| | | | | 248/459 |
| 8,269,124 B2* | 9/2012 | Jung | H01H 13/78 |
| | | | | 200/513 |
| 9,063,583 B2* | 6/2015 | Kim | H04M 1/236 |
| 9,135,527 B2* | 9/2015 | Hsu | G06K 13/0806 |
| 9,170,659 B2* | 10/2015 | Kim | G06F 1/1637 |
| 9,338,271 B2* | 5/2016 | Kim | H04M 1/236 |
| 9,414,505 B2* | 8/2016 | Hung | H05K 1/141 |
| 9,444,208 B2* | 9/2016 | Zhang | G06K 7/0073 |
| 2014/0181345 A1* | 6/2014 | Huang | G06F 13/4063 |
| | | | | 710/300 |

* cited by examiner

BUTTON-TYPE CONNECTOR MODULE AND ELECTRONIC DEVICE USING THE SAME

CROSS-REFERENCE TO RELATED APPLICATION

This application claims the priority benefit of Chinese application serial No. 201510083355.6, filed on Feb. 16, 2015. The entirety of the above-mentioned patent applications are hereby incorporated by references herein and made a part of specification.

BACKGROUND OF THE INVENTION

Field of the Invention

The invention relates to a button-type connector module and an electronic device and, more specifically, to a button-type connector module adapted to a pluggable hot plug component and an electronic device using the button-type connector module.

Description of the Related Art

With the technology development in recent years, electronic devices such as a notebook, a tablet computer and a mobile phone, are popular and widely used in daily life due to utility and convenience.

Currently, mobile phones are equipped with a pluggable component such as a subscriber identification module (SIM) card, a secure digital (SD) memory card, a micro secure digital (micro SD) memory card. A common way of installing the component is to open the whole back cover of the mobile phone and then plug the hot plug component into the connector, or to plug the component into the connector disposed at the side of the mobile phone.

BRIEF SUMMARY OF THE INVENTION

Accordingly, a movable button-type connector module for a pluggable hot plug component and an electronic device using the button-type connector module are provided to improve the convenience in use and meet requirement on thin-type electronic devices.

According to a first aspect of the present disclosure, a button-type connector module, disposed in an electronic device having a main body and a motherboard, and adapted to a pluggable hot plug component, the button-type connector module comprises: a push button unit; a connector including an accommodation recess, wherein the hot plug component is plugged into or removed from the accommodation recess when the connector moves relatively to the main body of the electronic device to expose the accommodation recess; and a circuit board disposed between the push button unit and the connector, wherein the push button unit and the connector are connected to the motherboard via the circuit board.

According to a second aspect of the present disclosure, an electronic device adapted to a pluggable hot plug component, comprises: a main body including a motherboard; and a button-type connector module disposed in the main body, including: a push button unit; a connector including an accommodation recess, wherein the pluggable hot plug component is plugged into or removed from the accommodation recess when the connector moves relative to the main body to expose the accommodation recess; and a circuit board disposed between the push button unit and the connector, wherein the push button unit and the connector are electrically connected to the motherboard of the main body via the circuit board.

In sum, in embodiments of the invention, the button-type connector module in embodiments is capable of moving relative to the main body to expose the accommodation recess for plugging in or pulling out a hot plug component, which improves the convenience in use. Moreover, since the button-type connector module is integrated as a module device, available interior space for accommodating electronic elements inside the electronic device is more. Furthermore, the first circuit layer and the second circuit layer of the circuit board are electrically connected to the push button unit and the connector respectively, therefore, no more circuit board for electrically connecting the push button unit with the connector is need. As a result, the whole thickness of the button-type connector module is reduced for thin-type electronic devices. In addition, the button-type connector module with the frame further facilitates the plug or removal of the hot plug component.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
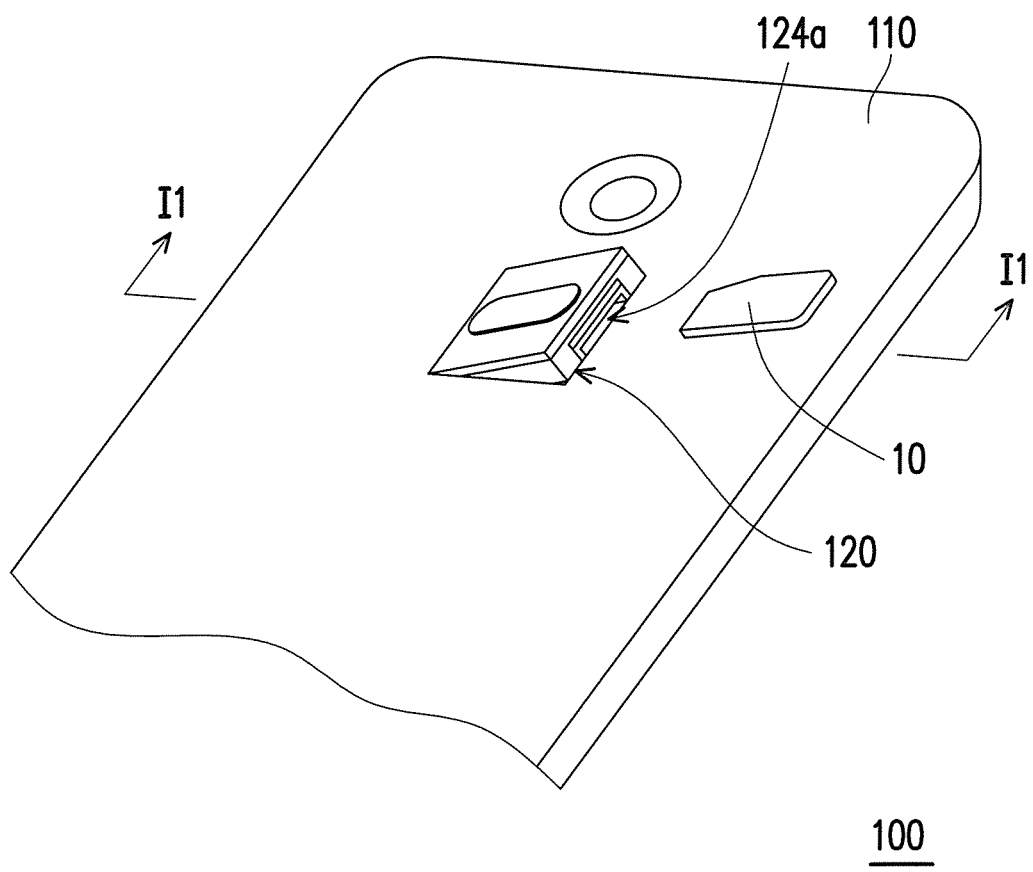
FIG. 1 is a partial perspective view of an electronic device in an embodiment.
Figure 2:
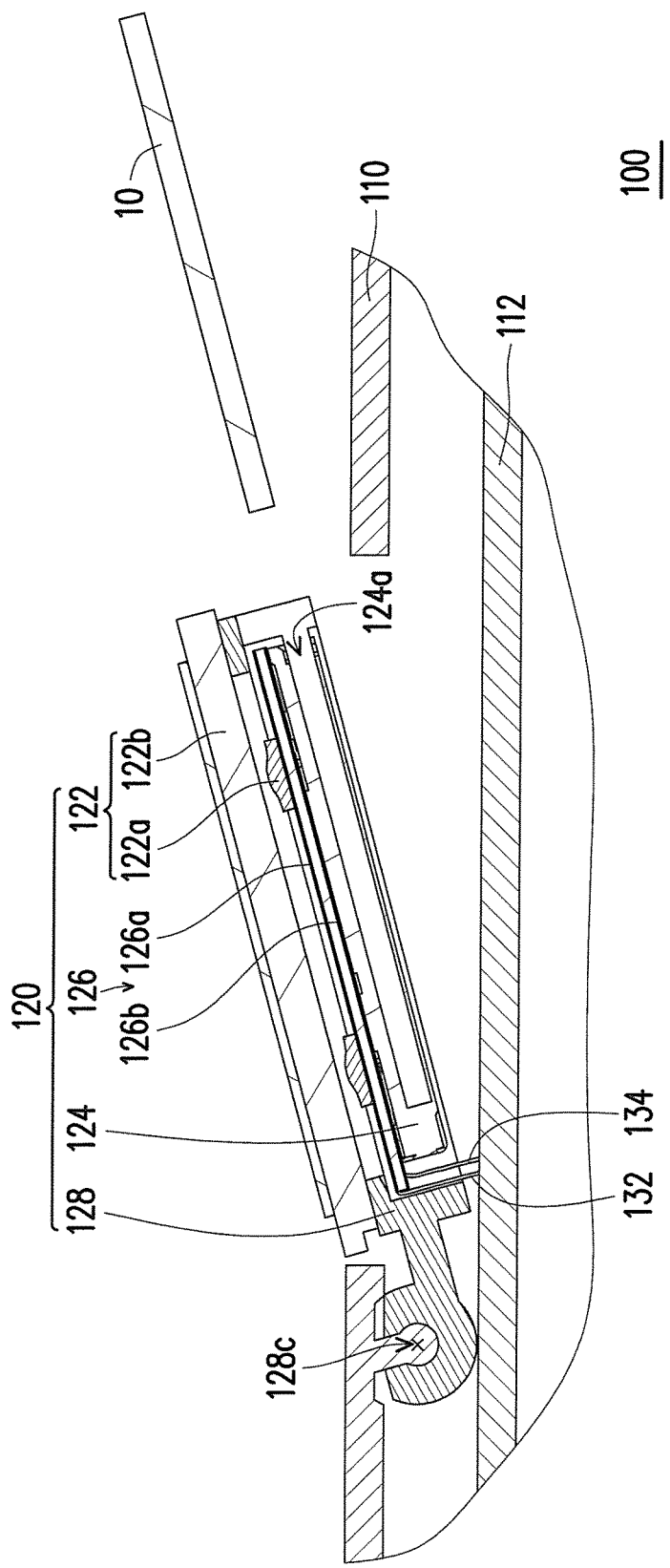
FIG. 2 is a partial sectional view of electronic device in FIG. 1 along a line I1-I1.
Figure 3:
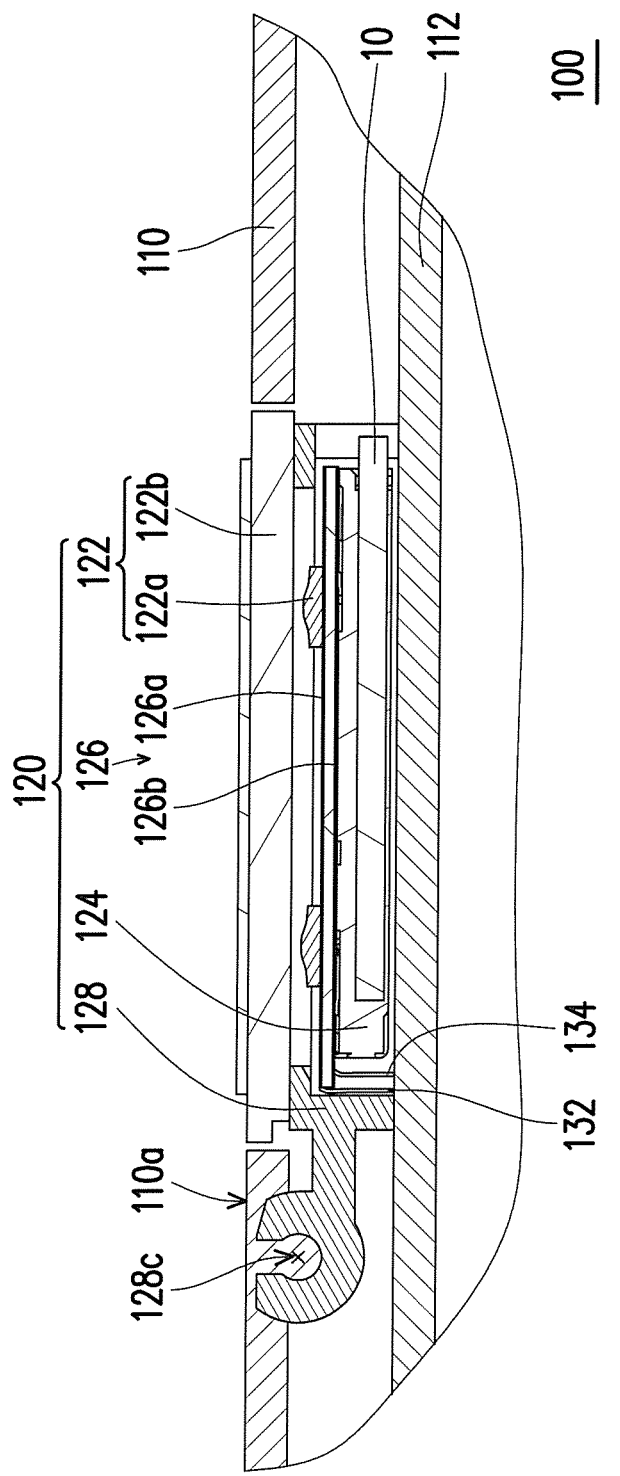
FIG. 3 is partial sectional view showing a hot plug component is plugged in FIG. 2.

FIG. 1 is a partial perspective view of an electronic device in an embodiment. Referring to FIG. 1, in the embodiment, an electronic device 100 adapted to a pluggable hot plug component 10 includes a main body 110 and a button-type connector module 120. The main body 110 of the electronic device 100 includes a motherboard 112 (as shown in FIG. 2 and FIG. 3). The button-type connector module 120 for the pluggable hot plug component 10 is disposed in the main body 110. In an embodiment, the electronic device 100 is, but not limited to, a notebook, a tablet computer or a mobile phone. In the embodiment in figures, the electronic device 100 is a mobile phone.

Figure 4:
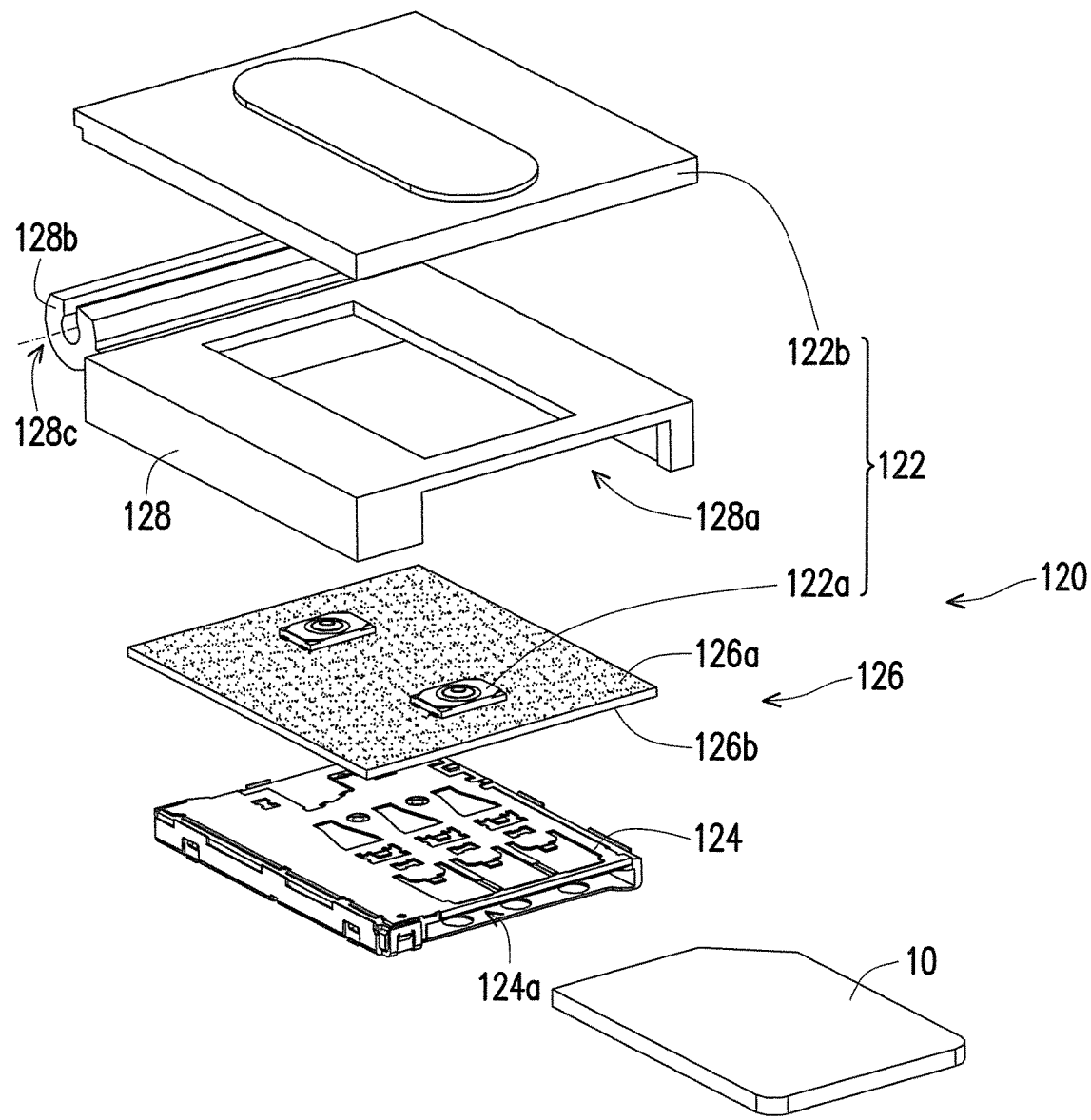
FIG. 4 is an exploded view of the button-type connector module in FIG. 1.

FIG. 2 is a partial sectional of electronic device in FIG. 1 view along a line I1-I1 in FIG. 1; FIG. 3 is partial sectional view showing a hot plug component is plugged in FIG. 2; FIG. 4 is an exploded view of the button-type connector module in FIG. 1. Referring to FIGS. 2-4, the button-type connector module 120 includes a push button unit 122, a connector 124 and a circuit board 126. The connector 124 is arranged under the push button unit 122. The connector 124 includes an accommodation recess 124a. When the connector 124 moves relative to the main body 110 of the electronic device 100 and exposes the accommodation recess 124a, the hot plug component 10 is capable of being plugged into or removed from the accommodation recess 124a. The circuit board 126 is disposed between the push button unit 122 and the connector 124. The push button unit 122 and the connector 124 are electrically connected to the motherboard 112 of the main body 110 via the circuit board 126. Since the connector 124 is capable of moving relative to the main body 110 to expose the 124a, it is convenient for a user to plug in or remove the hot plug component 120 out of the electronic device. Therefore, the button-type connector module 120 is user friendly. Moreover, the push button unit 122, the connector 124 and the circuit board 126 are integrated in a single module which occupies less space in the electronic device 100, therefore, more space for the layout of the electronic elements inside the electronic device 100 is available.

In the embodiment, the hot plug component 10 is a SIM card for the electronic device 100. In other embodiments, the hot plug component 10 is a connection interface (such as a Universal Serial Bus (USB) plug or a micro USB plug) of the electronic device 100 for connecting with another electronic device or a storage media (such as a SD memory card, micro SD memory card).

In the embodiment, the circuit board 126 includes a first circuit layer 126a and a second circuit layer 126b opposite to each other. The first circuit layer 126a is electrically connected to the push button unit 122 and the motherboard 112 of the electronic device 100. The second circuit layer 126b is electrically connected to the connector 124 and the motherboard 112 of the electronic device 100. The push button unit 122 includes a switch 122a and a push button 122b. The switch 122a is disposed on the circuit board 126. The push button 122b is exposed from the main body 110 of the electronic device 100 for the user to press to enable or disable the switch 132b. In the embodiment, the push button 122b protrudes from the surface 110a of the main body 110. In another embodiment, the push button 122b is aligned with the surface 110a of the main body 110. In the embodiment, the switch 122a is a power switch. In other embodiments, the number of the switches 122a is various according to practical requirements, such as a volume switch, a wake-up switch, an unlocking switch or a shooting switch. In an embodiment, two switches 122a are configured on the circuit board 126.

In an embodiment, the first circuit layer 126a and the second circuit layer 126b are formed by conducting materials which are disposed onto the top surface and the bottom surface of the circuit board 126. Then, the first circuit layer 126a and the switch 122a are combined together through a SMT method (surface mount technology) and the first circuit layer 126a is connected with the motherboard 112 via a flexible circuit board 132. The second circuit layer 126b and the connector 124 are also combined together through the SMT method and the second circuit layer 126b is connected with the motherboard 112 via a flexible circuit board 134. In the embodiment, since the switch 122a and the connector 124 are electrically connected to the motherboard 112 via the first circuit layer 126a and the second circuit layer 126b respectively, no additional circuit board for electrically connecting the switch 122a with the connector 124 is needed. In this way, the whole thickness of the button-type connector module 120 is reduced, and therefore, the electronic device 100 can be thinly configured.

In the embodiment, the button-type connector module 120 further includes a frame 128. The push button 122b and the circuit board 126 are disposed at two sides of the frame 128. The circuit board 126 is disposed between the connector 124 and the frame 128. The frame 128 includes a slot 128a and a pivot portion 128b. The circuit board 126 and the connector 124 are embedded into the slot 128a of the frame 128 to be fixed to the frame 128. The pivot portion 128b of the frame 128 is pivotally attached to the main body 110. When the connector 124 is rotated out of the main body 110 while the connector rotates around the axis 128c of the pivot portion 128b, the accommodation recess 124a is exposed. Thus, the hot plug component 10 is capable of being plugged into or removed out from the accommodation recess 124a of the connector 124, when the button-type connector module 120 is rotated out and exposed.

In the above embodiment, the button-type connector module 120 is exposed from the accommodation recess 124a by rotating relative to the main body 110. However, the way of exposing the accommodation recess 124a is not limited herein. In an embodiment, the button-type connector module 120 translates apart from the main body 110, and then the accommodation recess 124a is exposed. In an embodiment, when the button-type connector module 120 is assembled to the main body 110, the circuit board 126 of the button-type connector module 120 is disposed against the pogo pin connector (not shown) of the motherboard 112 to make the circuit board 126 electrically connected to the motherboard 112.

In sum, the button-type connector module in embodiments is capable of moving relative to the main body to expose the accommodation recess for a hot plug component to be plugged in or removed out, which improves the convenience in use. Moreover, since the button-type connector module is integrated as a module device, available interior space for accommodating electronic elements inside the electronic device is more. Furthermore, the first circuit layer and the second circuit layer of the circuit board are electrically connected to the push button unit and the connector respectively, therefore, no more circuit board for electrically connecting the push button unit with the connector is need. As a result, the whole thickness of the button-type connector module is reduced for more flexible arrangement in electronic devices. In addition, the button-type connector module with the frame further facilitates the connection or removal of the hot plug component.

Although the invention includes been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A button-type connector module, disposed in an electronic device having a main body and a motherboard, and adapted to a pluggable hot plug component, the button-type connector module comprising:
   a push button unit;
   a connector including an accommodation recess, wherein the hot plug component is plugged into or removed from the accommodation recess when the connector moves relatively to the main body of the electronic device to expose the accommodation recess; and
   a circuit board disposed between the push button unit and the connector, wherein the push button unit and the connector are connected to the motherboard via the circuit board.

2. The button-type connector module according to claim 1, wherein the circuit board includes a first circuit layer and a second circuit layer opposite to each other, the first circuit layer is electrically connected to the push button unit and the motherboard, and the second circuit layer is electrically connected to the connector and the motherboard.

3. The button-type connector module according to claim 1, wherein the push button unit includes:
   a switch disposed on the circuit board; and
   a push button exposed from the main body for driving the switch.

4. The button-type connector module according to claim 3, wherein the switch is a power switch, a volume switch, a wake-up switch, an unlocking switch or a shooting switch.

5. The button-type connector module according to claim 3, further comprising:
 a frame pivotally attached to the main body, the push button and the circuit board are disposed at two sides of the frame respectively, and the circuit board is disposed between the connector and the frame.

6. An electronic device adapted to a pluggable hot plug component, comprising:
 a main body including a motherboard; and
 a button-type connector module disposed in the main body, including:
  a push button unit;
  a connector including an accommodation recess, wherein the pluggable hot plug component is plugged into or removed from the accommodation recess when the connector moves relative to the main body to expose the accommodation recess; and
  a circuit board disposed between the push button unit and the connector, wherein the push button unit and the connector are electrically connected to the motherboard of the main body via the circuit board.

7. The electronic device according to claim 6, wherein the circuit board includes a first circuit layer and a second circuit layer opposite to each other, the first circuit layer is electrically connected to the push button unit and the motherboard, and the second circuit layer is electrically connected to the connector and the motherboard.

8. The electronic device according to claim 6, wherein the push button unit includes:
 a switch disposed on the circuit board; and
 a push button exposed from the main body for driving the switch.

9. The electronic device according to claim 8, wherein the switch is a power switch, a volume switch, a wake-up switch, an unlocking switch or a shooting switch.

10. The electronic device according to claim 8, wherein the button-type connector module further includes a frame pivotally attached to the main body, the push button and the circuit board are disposed at two sides of the frame respectively, and the circuit board is disposed between the connector and the frame.

11. The electronic device according to claim 6, wherein the pluggable hot plug component is a subscriber identification module card, a secure digital memory card, a micro secure digital memory card, a USB plug or a micro USB plug.

* * * * *